United States Patent

Nichols et al.

[11] Patent Number: 5,127,808
[45] Date of Patent: Jul. 7, 1992

[54] PORTABLE AIR PUMP

[76] Inventors: Alan Nichols, 210 Park St., Copiague, N.Y. 11726; Eric Kupferberg, 15 Commonwealth Ave., Massapequa, N.Y. 11758

[21] Appl. No.: 640,904

[22] Filed: Jan. 14, 1991

[51] Int. Cl.$^5$ .............................................. F04B 17/00
[52] U.S. Cl. ..................................... 417/411; 417/234
[58] Field of Search ................................. 417/411, 234

[56] References Cited

U.S. PATENT DOCUMENTS

| | | | |
|---|---|---|---|
| 2,960,321 | 11/1960 | Stoots | 417/411 |
| 4,621,984 | 11/1986 | Fussell | 417/411 X |
| 4,998,652 | 3/1991 | Champagne | 224/30 R X |

Primary Examiner—Leonard E. Smith

[57] ABSTRACT

A battery-operated air pump for a bicycle, adapted to serve as a transportable accessory by its size and cylindrical shape, so that it is readily carried in the rack usually used for a water bottle, and thus is accessible to the bicyclist as a substitute for the water bottle to be used for tire inflation and other end uses.

4 Claims, 1 Drawing Sheet

PORTABLE AIR PUMP

The present invention relates to an accessory for a bicycle, and more particularly to an improved portable battery-operated air pump for tire inflation and other selected end uses.

EXAMPLE OF THE PRIOR ART

It is already well know, as for example as described and illustrated in U.S. Pat. No. 4,621,984 issued to Fussell on Nov. 1, 1986, to provide an air pump that is powered by batteries and, as a consequence, is portable and used without regard to the location of a source of electrical power from a power plant or the like. The Fussell air pump is even recommended for bicyclists in order to take advantageous use of its portability. However, the rectangular shape and size of the Fussell air pump significantly detracts from this recommended end use since, in practice, the bicyclist could only transport the Fussell air pump in a rear luggage rack, which even for recreational purposes is inconvenient, and is clearly unsuitable for racing and sports uses of the bicycle.

It is thus an object of the present invention to provide a portable air pump as a bicycle accessory overcoming the foregoing and other shortcomings of the prior art. More particularly, it is an object to provide an air pump operated by batteries and of an improved shape and size rendering it convenient and advantageous for transport on a bicycle during recreational and even competitive sports' users.

In contrast with the prior art, the within inventive portable air pump is sized and embodied with the same cylindrical shape of a typical bicycle water bottle (i.e. particularly a so-called thermos bottle) and consequently transported on the bicycle as a substitute for the water bottle in the carrying rack usually used for the water bottle.

The description of the invention which follows, together with the accompanying drawings should not be construed as limiting the invention to the example shown and described, because those skilled in the art to which this invention appertains will be able to devise other forms thereof within the ambit of the appended claims.

As the description proceeds, reference will be made to components that are commercially readily available and whose construction and operational mode are already well known and which, for brevity's sake, will therefore not be described in detail. Included among these components are the following: A motor 28 which will be understood to be of the type sold as model RX540VZ by Techigold of Tamiya, Japan. An air compressor 30 which will be understood to be of the type described and illustrated in U.S. Pat. No. 4,621,984 issued on Nov. 11, 1986 to Fussell, incorporated herein by this reference, and of the type sold as model MC-15 by Intendynamics of Brooklyn, N.Y.; For facilitated connection to and disengagement from the air valve of a bicycle tire a so-called quick disconnect 82 of the type sold as model A.H. 135 by Bluemels of Wolston, England; a water bottle or popularly called thermos bottle bicycle carrying rack of the type sold as model PC-1 by Black Burn Design Inc. of Campbell, Calif. An electrical component for receiving the male plug or connector from a power source for recharging batteries, herein designated 45, of the type sold as model 643039 by Radio Shack of Ft. Worth, Tex., and 1.2 volt batteries.

Figure 1:
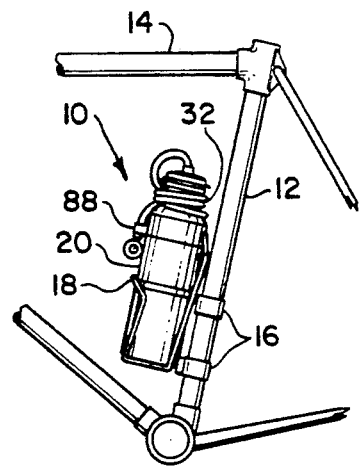
FIG. 1 is a side elevational view illustrating partially a bicycle, and the within inventive air pump in its position being transported on the bicycle.

In FIG. 1, the within inventive air pump 10 is shown mounted on the so-called downtube 12 of a bicycle frame 14. Downtube 12 is fitted with suitable brackets or conventional "braze-ons" 16 to support a typical water bottle carrying rack or cage 18.

Figure 2:
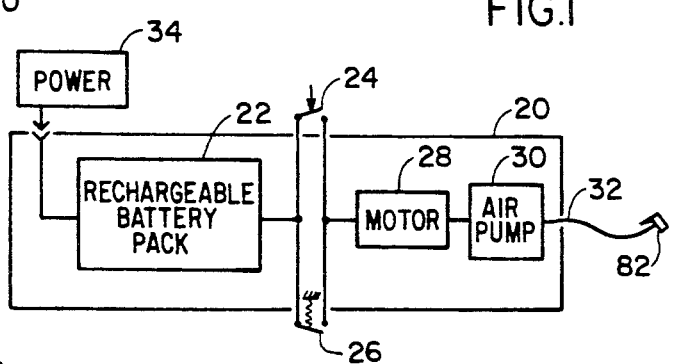
FIG. 2 is a schematic block and circuit diagram of the major components of the air pump.

Air pump 10 consists essentially of the components shown and labeled in schematic FIG. 2 in cooperation with a cylindrically shaped housing 20 that is used to enclose these components, namely a rechargeable battery pack 22, switches 24 and 26, a motor 28, an air compressor mechanism 30 and a compressed air delivery tube 32. Battery pack 22 can be recharged from conventional disconnectable power source 34.

Figure 3:
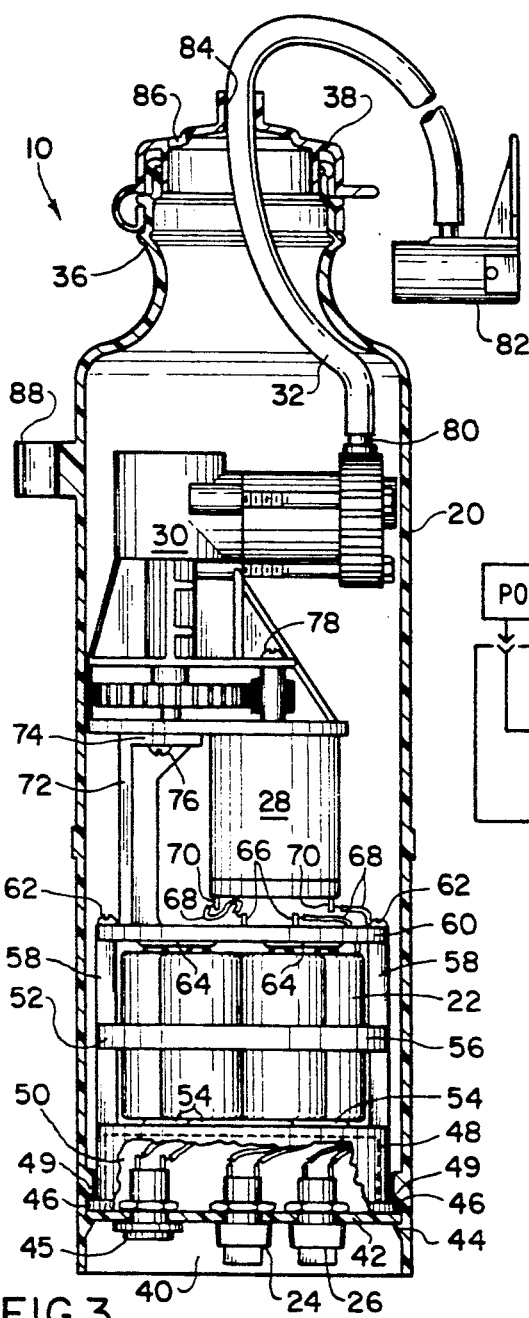
FIG. 3 is a vertical section of the air pump as taken along line 3—3 of FIG. 4.
Figure 4:
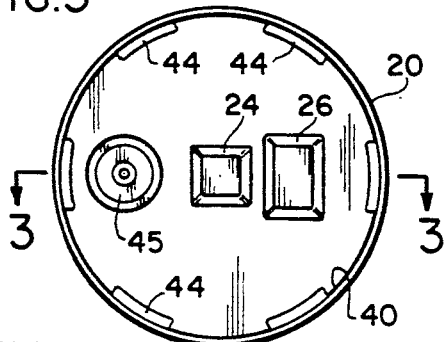
FIG. 4 is a bottom view projected from FIG. 3.

In the preferred embodiment as best shown in FIGS. 3 and 4, a generally cylindrical housing 20 is provided with the usual shape and size of a typical water bottle. The upper end 36 of housing 20 consists of a caplike member 38 that optionally can resemble that of a water bottle or have a simulated shape thereof and actually be integral with housing 20. The open lower end 40 of housing 20 is adapted to receive in a snap fit a planar end closure member 42. Member 42 is held in place by an array of snap type lugs 44 or otherwise appropriately fastened securely. Centrally located on member 42 is a latching type on/off switch 24. When switch 24 is pressed initially, motor 28 is activated and continues to run until switch 24 is pressed a second time to the off mode. Also mounted on panel 42, and wired in parallel with switch 24, is a pulsing switch 26. When using switch 26 to activate motor 28, it is necessary for the user to continuously depress switch 26 to maintain the on mode. Release of the button on switch 26 terminates the operation of motor 28. This enables pressure air to be delivered in short bursts. Also mounted on panel 42 and wired in parallel with switches 24 and 26, is a coaxial type receptacle 45 for connection to power source 34 by means of a conventional recharge wire connector (not shown), used in a well understood manner for recharging the batteries 22.

When panel member 42 is snapped within lugs 44 or otherwise fastened in place, it retains a flange 46 on frame base 48 against a shoulder 49 within housing 20. Base 48 encloses a wiring compartment 50 and supports a nest 52 of batteries comprising the battery pack 22. Batteries 22 rest upon electrical contact strips 54 built into base 48. The batteries, more particularly, are seven in number, with one battery centrally located on the longitudinal axis of the cylindrical housing 20 and the remaining six batteries disposed in encircling relation about the centrally located battery. A shaped circular member 56 is in turn disposed in encircling relation about the peripheral six batteries and retains batteries 22 relative to strips 54. Base 48 includes a pair of up-rights 58 which support a disk member 60 fastened thereon with screws 62. Like base 48, disk member 60 is fitted with electrical contact strips 64. Strips 54 and 64 complete circuits for the 1.2 volt batteries 22 selected to provide adequate voltage for motor 28 via terminals 66 on the top side of disk 60. Flexible leads 68 carry current from terminals 66 to motor terminals 70 when either or both switches 24 and 26 are in the closed mode.

Disk member 60 also serves as a support base for pedestal 72. An air compressor mechanism 30 is connected to a flange 74 on the upper end of pedestal 72 by screws 76. Although not shown because it is already well known, air compressor 30 will be understood to include a reciprocating piston within a cylinder, and as shown in FIG. 3 is oriented so that the piston is urged through movement radially, which contributes to the compact arrangement of the components within the limited confines of the cylindrical housing 20. Motor 28 is fastened to air compressor 30 and suspended therefrom by screws 78. The suspension of the motor 28 from the air compressor 30 as just noted, in conjunction with the location of the previously noted battery terminals 66 of the disk 60, also significantly contributes to the compact arrangement of the components within the housing 20. More particularly, in the noted suspended position, the motor terminals 70 are located in a close clearance position about the disk 60 while the battery pack 22 is located with its male terminals 64 in adjacent position below the disk 60, thus facilitating making the electrical connection using the wiring 68 between the batteries 22 and the motor 28.

Compressor 30 has an air outlet 80 which connects to air delivery tube 32. Tube 32 is additionally fitted wit a quick disconnect fitting 82 commonly used with the popular Scharder-manufactured tire valve and typical supports ball air inflation needle.

At assembly, tube 32 is threaded through opening 84 in cap 38 for connection to air outlet 80. Wiring of switches 24 and 26, receptacle 45 and motor 28 are done exteriorly of housing 20, after which the major components 22, 28 and 30 are assembled on support members 48 and 60 with screws 62 and 76. Cap configuration 38 is made with a vent port 86 to balance any negative pressure that might build up within housing 20 during use of the air pump 10. During non-use periods, delivery hose 32 is stored by friction forcing the free end thereof between opposed arms of an integrally molded clip 88. When not in use or on its recharge cycle, the air pump 10 is conveniently stored in carrier cage 18. It is, in fact, the convenient storage and transport of the air pump 10, made possible because the size and cylindrical shape of its housing 20 is compatible with the size and similar cylindrical shape of the carrying rack 18, that is a significant patentable contribution to the portable battery-operated air pump art, in that it enables the within air pump 10 to be substituted for the typical water or thermos bottle normally placed in the carrying rack 18.

Figure 5:
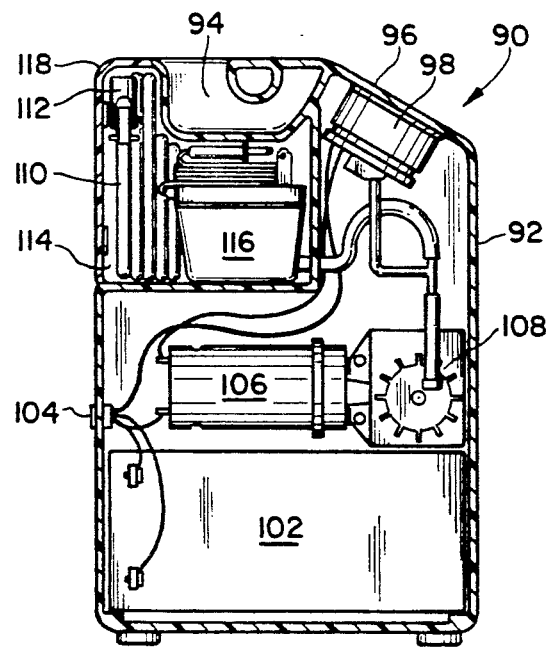
FIG. 5 is a vertical section of a prior art air pump for specific comparison with FIG. 3.

This is demonstrated by comparison of the within air pump 10 with the prior art air pump of U.S. Pat. No. 4,621,984 issued on Nov. 11, 1986 to Fussell. In FIG. 5 of this prior art patent, an air pump 90 has a generally rectangular housing 92. Housing 92 is provided with a handle recess 94 in its upper surface and a nearby panel 96 is fitted with an air pressure gage 98. Panel 96 also has an on/off switch 100 (not shown). A battery pack 102, which can be recharged at receptacle 104, is electrically connected to motor 106 through switch 100. Motor 106 is operatively connected to drive air compressor 108 which discharges pressure air through air delivery hose 110. Like the within hose 32, the prior art hose 110 is fitted with a quick disconnect coupling 112. Hose 110, when not is use, is stored within a compartment 114 along with a battery recharge unit 116. Compartment 114 is accessible through a hinged doorlike section 118 of housing 92. Although noted as being also useful for bicycle tire inflation and other selected end uses, the prior art air pump 90 is too large to be conveniently carried and transported on a bicycle, and certainly cannot be substituted for the typical water bottle usually transported with the carrying rack 18.

While the apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. In combination with a bicycle water bottle carrying rack of the type sized and shaped to corresondingly bound a carrying compartment sized and cylindrically shaped for receiving said water bottle therein incident to transporting same during use of said bicycle, the improvement of a battery-operated air pump for substitution for said water bottle, said air pump comprising a cylindrical housing having an open bottom and of a size and cylindrical shape to be received in said compartment of said water bottle carrying rack, said cylindrical housing having a longitudinal axis, a panel member adapted for mounting within said cylindrical housing proximate said open bottom thereof in a generally sealing relationship therewith and supporting plural batteries disposed in circumferential relation about said longitudinal axis within said cylindrical housing for operating an air pump, bracket means mounted to said panel member extending longitudinally within said housing and support a motor electrically connected to said batteries and a reciprocating piston and cylinder type air pump, said air pump being disposed in a radial orientation in said cylindrical housing and operatively connected to have said piston urged through pumping movement within said cylinder by said motor to thereby provide pressure air, said motor and air pump being mounted serially longitudinally to said bracket means long said longitudinal axis of said housing, said batteries, motor and air pump being otherwise not connected to said cylindrical housing whereby the user of said bicycle has an available source of pressure air for tire inflation and selected end uses.

2. The air pump for a bicycle as claimed in claim 1 wherein said batteries each have an electrical terminal at one end and are disposed with said electrical terminals at a selected location along said housing longitudinal axis, said bracket means having electrical contacts therein for engagement with said electrical terminals of said batteries to thereby facilitate completing the electrical connection between said batteries and said motor and contributing to the compact arrangement of the air pump components within said cylindrical housing.

3. The air pump for a bicycle as claimed in claim 2 wherein said batteries are located adjacent one end of said cylindrical housing and including a flexible hose connected from said air compressor to extend from the opposite end of said housing.

4. The air pump as claimed as in claim 1 further comprising operating switches mounted to said panel member and electrically connected to said batteries and motor, said switches being recessed within said cylindrical housing.

* * * * *